UNITED STATES PATENT OFFICE.

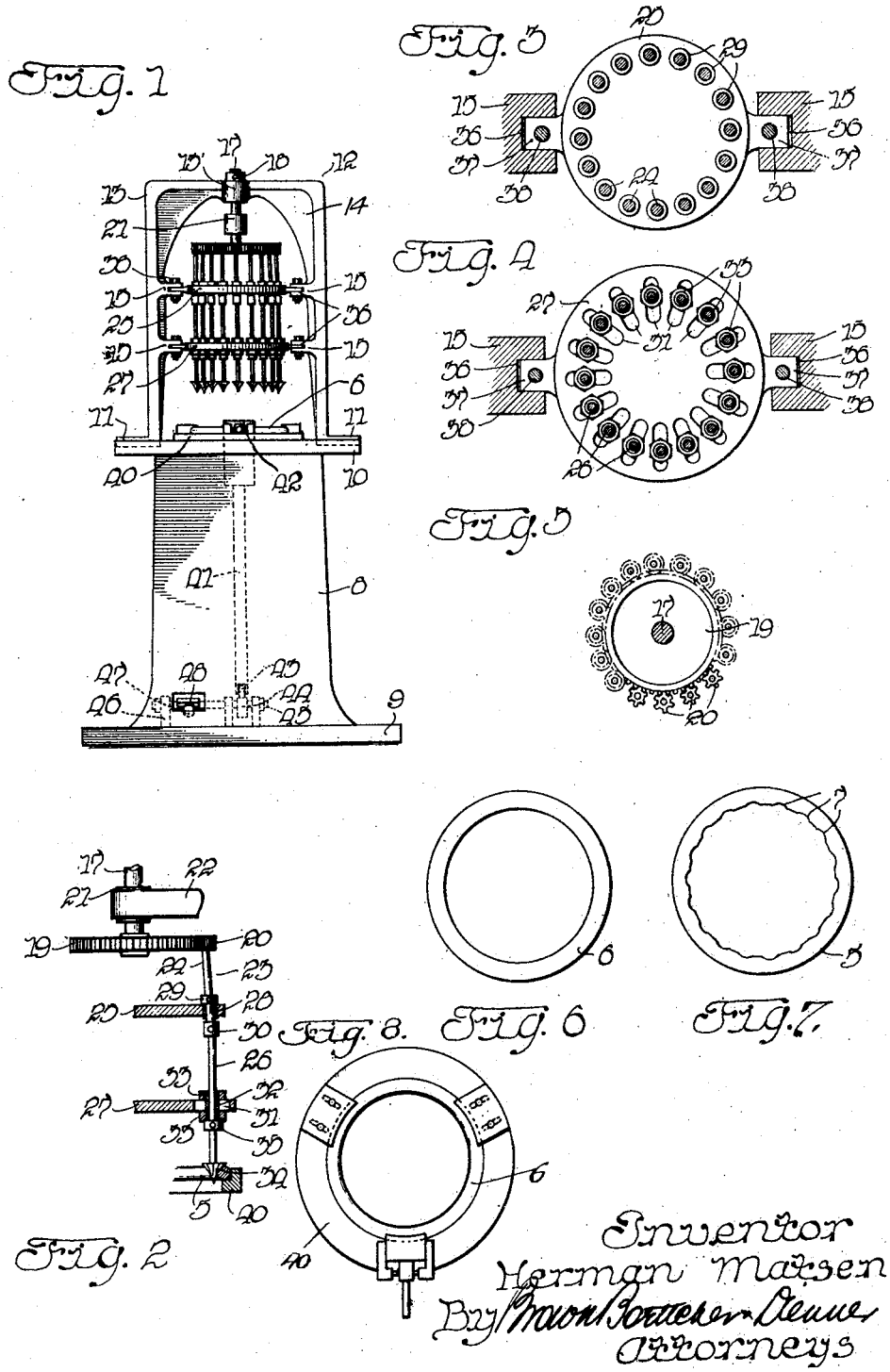

HERMAN MATSEN, OF CHICAGO, ILLINOIS.

CORRUGATING MACHINE FOR STEERING WHEELS.

1,411,055. Specification of Letters Patent. Patented Mar. 28, 1922.

Application filed August 9, 1920. Serial No. 402,482.

*To all whom it may concern:*

Be it known that I, HERMAN MATSEN, a citizen of the United States, residing at Chicago, in the county of Cook and State of Illinois, have invented a certain new and useful Improvement in Corrugating Machines for Steering Wheels, of which the following is a full, clear, concise, and exact description, reference being had to the accompanying drawings, forming a part of this specification.

My invention relates to wood-working machines, and particularly to machines for corrugating or grooving steering wheels for vehicles, motor boats, etc.

While my invention is primarily designed for corrugating or grooving the inner periphery of steering wheels for vehicles of any description, it is readily apparent that the fundamental features may be embodied in various ways equally as well in other objects having similar or dissimilar characteristics.

It is well known in the use of steering wheels that the driver's hands must positively grip the periphery of the wheel in order to insure perfect steering of the vehicle. This positive grip is often lost due to perspiration on the driver's hands, or to the unusual fine finish of the wheel, which in both cases permit slipping of the operator's hands, occurring usually at vital periods of driving, such as crossing a street or turning the corner at congested business intersections.

I have found that, if the steering wheel is grooved on the inner periphery to the contour of the fingers which usually extend about the wheel so as to grip this portion, a positive engagement of the hands of the operator with the steering wheel may be obtained, and that the previous difficulties encountered by perspiration on the hands and slipping due to a highly finished surface is totally eliminated. It is, therefore, an object of this invention to provide a machine of the above type which will perform in one operation a grooving or corrugating operation on the inner periphery of a steering wheel.

As a further object of my invention, the machine is so designed that the corrugating operation may be performed upon the wheels with great rapidity and that the production of the same may be had in large quantities. This is accomplished by advancing the unfinished steering wheel toward a plurality of cutters (or conversely) which are disposed in spaced relation to each other as to permit the cutters to engage the wheel, corrugating the same in one movement of the machine.

Another object of the invention is to provide a wood-working machine, wherein the wood-working and carrying elements can be easily and quickly adjusted for the purpose of readily adapting the machine to the production of different sizes of wheels or wheels of different characteristics.

The construction and operation of a preferred embodiment of my invention will be apparent from the following detailed description taken in connection with the accompanying drawings, in which:

Figure 1 is a front elevational view of a machine embodying the principles of my invention, the view being taken from the operator's side of the machine;

Figure 2 is a fragmentary vertical sectional view taken through the vertical plane of a cutter to illustrate the manner of driving the same;

Figure 3 is a fragmentary detailed view of one of the bearing plates for supporting the cutter spindles;

Figure 4 is a similar fragmentary detailed view of a second bearing plate in which is provided slots for permitting adjustment of the cutters;

Figure 5 is a fragmentary detailed view of the driving mechanism for the cutters;

Figure 6 is a view of a steering wheel before the corrugating operation is performed thereon;

Figure 7 is a view of the same after the corrugating operation is performed; and Figure 8 is a top plan view of the chuck for clamping the rim.

The operation and the function of the machine will be more clearly understood by a brief description of the finished wheel 5 as shown in Figure 7. The steering wheel blank 6, as shown in Figure 6, is formed from a blank of wood in various operations by machines which are not concerned with the present invention. After the blank wheel is formed annular in form to the proper dimensions, it is placed in the machine embodying my invention, and in one operation of the machine, the inner periphery is provided with a plurality of grooves or corrugations 7. The corrugations are so spaced apart that the hand of the driver may properly grasp the same, the fingers comfortably resting in the corrugations.

As shown in Figure 1, the machine comprises the pedestal frame 8 having the base 9 and the working table 10. The outer ends of the working table are grooved to receive feet 11 of the vertical extending arched frame member 12 by which the cutters are supported. The frame member 12 is U-shaped in formation and is provided with the outer ribs 13 which are reinforced by web 14. The vertical legs of the ribs 13 have formed thereon the oppositely disposed pairs of lugs 15, provided with a horizontal slot 36. The upper or horizontal rib 13 of the frame 12 is formed with a bearing 13' which is adapted to receive the shaft 17.

The shaft 17 has a collar 18 provided on the outer or upper end which prevents downward displacement of the same. The opposite end of the shaft 17 has secured thereon the driving gear 19 which meshes with a plurality of pinions 20. Disposed on the shaft 17 between the bearing 13' and driving gear 19 is the pulley 21 over which is entrained the belt 22. The belt 22 leads from any suitable driving source, which may be a motor or an overhead countershaft as employed in wood-working shops.

The pinions 20 are adapted to be carried in any suitable manner on the upper ends of the spindles 23. The spindles 23 are preferably formed in two parts, the upper part 24 being guided in the bearing plate 25 while the lower part 26 is supported and guided in the bearing plate 27. The bearing plate 25 is provided with apertures in which bearing sleeves 28 are disposed. The spindle 24 passes through this sleeve 28 and has a collar 29 secured thereon, bearing on the upper side of the sleeve 28 to prevent downward displacement of the spindle. The universal joint connection 30 joins the upper section 24 with the lower section 26 of the spindle and permits angular movement of the lower section without displacing the pinion 20 from meshing engagement with the driving gear 19.

As above mentioned, the section 26 of the spindle is supported and guided in the bearing plate 27. The bearing plate 27 is provided with a plurality of radially cut slots 31 for the reception of the externally threaded sleeve 32. The upper and lower ends of the sleeve 32 protrude from the slots and are adapted to have threaded thereon the nuts 33 which adjustably retain the sleeve 32 in the slot 31. At the lower free ends of the spindle, cutters 34 are carried. Upward displacement of the spindles is prevented by the collar 35.

The lugs 15 formed upon the vertical ribs 13 of the super-imposed frame member 12, are provided with horizontal slots 36 in which are disposed lugs or ears 37 formed integrally on the bearing plates 25 and 27. The lugs 37 are maintained in position in the slots 36 by means of the bolts 38. If it is so desired, adjustment of the lugs 37 in the slot 36 may be had so as to more easily acquire alignment of the cutters 34 with the wheel carrying chuck 40.

The arrangement of the cutter 34 and the bearing plates 25 and 27 provides in reality a boring head stationary in position. In order that the cutting operation may be performed upon the wheel blank 6, the same must approach the boring head so that the inner periphery thereof comes in contactual engagement therewith in such a manner as to cut the proper depth of grooves evenly around the wheel. This is accomplished by placing the wheel blank 6 in the chuck 40 which may be stationarily mounted, or may be detachably mounted, on the vertical shaft 41.

As shown in Figure 1, I have provided the chuck 40 adjustable so as to accommodate various sized wheels. The construction of the chuck is a type commonly employed and hence need not be described. The working table 10 of the pedestal frame 8 is provided with a rigid bearing 42 upon which the chuck 40 rests. The shaft 41 may extend downwardly within the pedestal frame 8 terminating at the lower end thereof with a roller 43. The roller 43 is adapted to ride the cam 44 carried by a rocker shaft 45. This shaft 45 is suitably supported within the frame, as by bearing lugs 46. A treadle shaft or rod 47 rigidly connects with the rocker shaft 45 and projects frontwardly, the free end ending without the machine with a pedal 48 mounted thereon. The treadle mechanism shown is merely illustrative and hence, can be revised to more suitably meet the needs, if desired.

The operation of the machine is as follows:

Assuming that the cutters are being driven by the pinions 20 meshing with the gear 19 and the shaft 17 driven by the pulley 21 and belt 22, a wheel blank 6 is placed in the chuck 40 which is adjusted to the size of the wheel. The operator of the machine then works the treadle mechanism which causes the cam 44 to properly raise the shaft 41, and in turn, advance the chuck 40, bringing the wheel blank 6 into cutting engagement with the cutters 34, thereby permitting the same to properly corrugate the inner periphery of the wheel. The operator then returns the chuck 40 to lower position by releasing the treadle mechanism. The finished head as shown in Figure 5, is removed from the chuck 40 and another wheel blank 6 inserted, the operation then being repeated.

The degree of curvature of the grooves 7 will be wholly dependent on the particular design of cutter employed, providing no other operation is relied upon to cut the wheel further before being finished. In this particular case, the cutting periphery of the cutters 34 are such as will provide the grooves 17 when the blank 6 is advanced into cutting relation. It is to be noted that the cutters tangentially engage the surface of the wheel which produces a double curved surface more suitable for a finger to engage.

Assuming that a larger size wheel is to be corrugated by the machine shown. The chuck 40 is first adjusted to accommodate the new size wheel. The nuts 33 are then loosened and the movable part 26 of the cutter spindle 23 positioned in the slot 31 so as to properly align with the inner periphery of the wheel blank 6 in the chuck. The nuts 33 are again threaded down on the sleeve against the plate 27, thereby maintaining the spindles tightly in position. Thus, it is to be seen that the machine is capable of accommodating any size wheel blank, making the machine universally adaptable to corrugating various size steering wheels.

It is to be noted that the adjustability of the cutters provides for a very important result in the corrugation of the rim 5. It has been found that certain automobile makers desire large corrugated grooves while others prefer slight indentations, merely sufficient to roughen the surface to secure a positive grip, and thereby do away with the slippery smooth inner periphery. The depth of the cut may be varied by adjusting the cutters 5 radially for any particular size rim without correspondingly increasing the size of the chuck 40.

The embodiment shown is merely illustrative of the features of my invention. Other arrangements and constructions are also possible which would produce the various features of this invention and I do not, therefore, intend to limit myself to the particular construction and arrangement shown.

I claim:

1. In a corrugating machine for wheel rims and the like, the combination with a supporting frame, of a plurality of cutters arranged on said frame, driving mechanism for said cutters, a clamp carried by said frame, said clamp adapted to retain and advance said wheel rim into cutting engagement with said cutters in order that the cutting periphery of the same will be partially engaged by the inner periphery of the rim to provide a plurality of cuts corresponding to the curve of the cutters.

2. In combination, a supporting frame, a driving shaft on said frame, a gear on said driving shaft, a plurality of spindles having cutters with curved cutting surfaces adapted to engage tangentially the surface to be cut, pinions on said spindles for meshing with said gear, a clamp adapted to carry an annular rim therein, and means for advancing the clamp axially into operative relation with said cutters whereby a plurality of grooves will be cut in the inner periphery of the rim.

3. In combination, a supporting frame, a plurality of spindles forming a boring head carried by said frame, said spindles having cutters at one end thereof, a drive for said spindles, a clamp disposed opposite said cutters and adapted to be adjustable for carrying various size wheel rims, said spindles having adjustment to compensate for the adjustment of said clamp and means for bringing said cutters and wheel rim in said clamp into contactual engagement whereby a grooving or corrugating operation is performed on the periphery of the wheel rim.

4. In combination, a supporting frame, a clamp carried by said frame, said clamp being adjustable to accommodate various size wheel rims, bearings on said frame, spindles carried by said bearings, a portion of said spindles being flexible and having cutters of the free ends thereof, said cutters provided with curved cutting surfaces, said flexible portions permitting alignment of said cutters with the periphery of said wheel rim, the cuts being of a double curved surface corresponding to the curve of the cutter.

5. In combination, a supporting frame, a movable work holder carried by said frame, a plurality of spindles having their free ends provided with cutters which have curved cutting surfaces adapted tangentially to engage the surface to be cut for producing a double curved cut, means for advancing axially said work holder into operative relation with said cutters, a drive for said spindles, part of said spindles having a fixed position on said frame, the other part of said spindles having adjustability whereby the depth of said cut may be varied.

6. The method of producing corrugations on a wheel rim, which consists in axially advancing the rim into engagement with a plurality of rotating cutters to present a certain portion of the rim in order that the periphery of each cutter will tangentially engage the surface of the rim.

In witness whereof I hereunto subscribe my name this 7th day of August, 1920.

HERMAN MATSEN.